(12) United States Patent
Weiler et al.

(10) Patent No.: US 6,761,252 B1
(45) Date of Patent: Jul. 13, 2004

(54) PARTIALLY LINED DISK BRAKE WITH ELECTROMECHANICAL ACTUATOR UNIT

(75) Inventors: Rolf Weiler, Eppstein (DE); Jürgen Balz, Hünstetten-Oberlibbach (DE); Werner Denhard, Steinau (DE); Stephan Heiderich, Büttelborn (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/958,566

(22) PCT Filed: Apr. 13, 2000

(86) PCT No.: PCT/EP00/03342
§ 371 (c)(1),
(2), (4) Date: Jan. 11, 2002

(87) PCT Pub. No.: WO00/61962
PCT Pub. Date: Oct. 19, 2000

(30) Foreign Application Priority Data

Apr. 13, 1999 (DE) .......................................... 199 16 737

(51) Int. Cl.[7] .............................................. F16D 55/08
(52) U.S. Cl. ..................................... 188/72.7; 188/71.8
(58) Field of Search ............................... 188/158, 71.8, 188/71.9, 72.7, 72.8, 162; 303/20

(56) References Cited

U.S. PATENT DOCUMENTS

| 4,546,295 A | * | 10/1985 | Wickham et al. ............ 318/372 |
| 4,804,073 A | * | 2/1989 | Taig et al. .................. 188/72.1 |
| 4,836,338 A | * | 6/1989 | Taig ............................ 188/72.1 |
| 4,877,113 A | * | 10/1989 | Taig .......................... 188/82.84 |
| 4,953,668 A | * | 9/1990 | Severinsson ................ 188/158 |
| 5,819,884 A | * | 10/1998 | Giering ...................... 188/71.9 |
| 5,829,557 A | * | 11/1998 | Halasy-Wimmer et al. . 188/162 |
| 5,931,268 A | * | 8/1999 | Kingston et al. ........... 188/162 |
| 6,012,556 A | * | 1/2000 | Blosch et al. .............. 188/71.8 |
| 6,142,265 A | * | 11/2000 | Reimann et al. ........... 188/158 |
| 6,173,820 B1 | * | 1/2001 | Blosch et al. ............... 188/158 |
| 6,186,599 B1 | * | 2/2001 | Otomo et al. ................. 303/20 |

FOREIGN PATENT DOCUMENTS

| DE | 43 12 524 | 10/1994 |
| DE | 196 45 825 | 1/1998 |
| FR | 2 757 918 | 7/1998 |
| WO | 96/03301 | 2/1996 |

* cited by examiner

Primary Examiner—Robert A. Siconolfi
(74) Attorney, Agent, or Firm—Rader, Fishman & Grauer PLLC (57) ABSTRACT

The present invention relates to an electromechanically actuated partially lined disk brake suitable both for realizing driving and parking brake functions. For this purpose, the partially lined disk brake comprises a brake caliper with an electromechanical actuating unit, by means of which the partially lined disk brake can be clamped by way of at least one interposed actuating element. The object of the invention is to achieve a compact design and a parking brake that can be actuated electrically. The brake caliper includes a multi-step reduction gear arranged between the integrated actuating unit and an actuating element. The actuating unit, reduction gear and actuating element are arranged in a recess of the brake caliper that is configured as a housing. According to the invention, the multi-step reduction gear is configured as a non-self-locking device, i.e. exhibits an overall efficiency of η>50%, and also is provided with an engageable freewheel, by means of which both driving and parking brake functions can be realized.

18 Claims, 5 Drawing Sheets

PARTIALLY LINED DISK BRAKE WITH ELECTROMECHANICAL ACTUATOR UNIT

TECHNICAL FIELD

The present invention generally relates to vehicle brakes and more particularly relates to an electromechanically actuated partially lined disk brake that can be used both for regular braking functions and parking brake functions.

BACKGROUND OF THE INVENTION

This kind of electromechanically actuated disk brake is known from EP 0 728 089 B1. The disk brake described therein has a floating brake caliper as well as an actuating unit arranged on the brake caliper. The actuating unit exhibits an electric motor which sets an actuating element by means of an interposed reduction gear. The actuating element causes one of two brake linings displaceably arranged in the brake caliper to come into contact with a brake disk. The second brake lining also is pressed onto the brake disk by a reaction force acting on the brake caliper. Despite its compact structural design, this disk brake has a drawback in that it can only develop a limited braking force in both driving and parking brake functions.

DE 197 32 168 C1 describes a hydraulic vehicle brake with parking brake device, where a brake piston is arranged displaceably within a hydraulic chamber of the vehicle brake. The brake piston can be shifted into an actuating position within the brake caliper by means of hydraulic pressure: it acts together with a brake lining in such a way that the brake piston presses the brake lining against a brake disk. In order to ensure that, in addition to its function as a hydraulic driving brake, the vehicle brake also can be used as a parking brake, a spindle-and-nut configuration, which is driven by an electric motor, is arranged co-axially to the axis of the brake piston. Furthermore, a complex reduction gear is required in addition to an electric motor to generate the necessary clamping forces for a parking brake function. Thus, the above-mentioned vehicle brake needs two independent actuating paths, namely an hydraulic and an electromechanical one. This in turn requires a complex overall design of the vehicle brake and a complicated process for operating or controlling the vehicle brake.

The object of the present invention is to provide an electromechanically actuated partially lined disk brake that has a simple design and can be used both as a driving and parking brake and can be operated with economic efficiency and comfortably.

This object is solved by means of an electromechanically actuated partially lined disk brake of the present invention. Accordingly, the partially lined disk brake of the present invention comprises a brake caliper with an electromechanical actuating unit having at least two brake linings displaceably arranged in the brake caliper, each of which acts on a friction surface of a brake disk and one of which is brought into contact with the brake disk by means of at least one actuating element. In terms of effect a multi-step reduction gear is arranged between the actuating unit and actuating element, with the actuating unit, reduction gear and actuating element being located in a recess of the brake caliper that is configured as a housing. This allows a particularly compact design of the brake caliper, with the brake caliper being able to realize both the driving and parking brake functions. All in all, the multi-step reduction gear is configured as a non-self-locking device, i.e. it exhibits an overall efficiency of $\eta > 50\%$. Thus, the clamping force from the electromechanical actuating unit to the brake linings is transmitted with as little loss as possible and, consequently, very efficiently. In addition, an engageable freewheel acting together with the reduction gear is included. By means of this engageable freewheel it is possible, in the event of activation, to lock the clamped brake caliper like a return stop in order to realize the parking brake function. In the direction of rotation of clamping of the actuating unit or non-self-locking reduction gear, the transmission of the brake clamping force from the actuating unit to the brake linings is not affected.

A particularly advantageous embodiment of the partially lined disk brake is achieved by having the reduction gear comprise a rolling-element ramp-type gear. This type of gear allows a rotary input variable to be converted into a translational output variable while ensuring a high reduction ratio. For this purpose, the rolling-element ramp-type gear preferably exhibits several ramps concentrically residing one inside others, allowing a large usable angle of torsion. The translational stroke of this type of gear is coordinated with the respective actuating stroke of the brake piston, in particular the translational stroke corresponds to this actuating stroke. For this purpose, the rolling-element ramp-type gear preferably comprises two ramp halves that can be twisted relative to one another; of these, the first ramp half is connected to the electromechanical actuating unit at the output end and a second ramp half is operatively connected to the actuating element. When the partially lined disk brake is operated, the two ramp halves can be twisted against one another to generate the actuating stroke and to transmit this to at least one of the brake linings via the actuating element. Preferably, the second ramp half, i.e. the one that is operatively connected to the actuating element, is secured against twisting; however, it must be possible to shift it in the housing of the brake caliper by the size of the actuating stroke of the brake lining.

According to a preferred embodiment of the invention, the engageable freewheel is designed as a return lock that is effective in the direction opposite to the direction of rotation of clamping of the reduction gear. When the brake is clamped, this return lock does not affect the function of the reduction gear. The non-self-locking reduction gear is prevented from reversing only in a clamped state and when the freewheel is blocked. Hence, the brake can be locked in a clamped state and, thus, secured against release of the brake due to decreasing clamping force of the brake. In order to release the brake, the lock function of the freewheel can be deactivated by means of a switching function when the reduction gear is rotated in the direction of release.

According to an advantageous embodiment of the invention, the multi-step reduction gear comprises a planetary gear step connected to the electromechanical actuating unit at the driving end as well as a spur gear step connected thereto, which acts together with the rolling-element ramp-type gear at the output end. By means of the planetary gear step in connection with the spur gear step, a particularly high step-down ratio is achieved for the entire reduction gear despite very low space requirements.

A particularly effective and easy-to-realize embodiment of the partially lined disk brake according to the present invention is achieved by providing the actuating element with a brake piston that is displaceably arranged in the brake caliper as well as at least one brake piston operatively connected to a brake lining, which is connected to the rolling-element ramp-type gear at the output end. As regards the overall design of the brake caliper in this connection, well-known design features of a brake caliper with a hydraulic actuating unit may be applied.

In order to maintain constant the translational stroke of the reduction gear when operating the partially lined disk brake, the actuating element preferably comprises also an adjusting device that is displaceably arranged in the brake caliper and can be extended in the clamping direction of the partially lined disk brake, wherein such adjusting device is operatively connected to at least one brake lining on the one hand and to the rolling-element ramp-type gear at the output end on the other hand. The extendable adjusting device takes into account the wear of the brake linings and is extended in proportion to the wear of the brake linings. Each actuating stroke of the brake piston or the stroke of the ramp half of the rolling-element ramp-type gear arranged displaceably in the direction of clamping in the brake caliper housing is maintained over the entire service life of the brake. In an advantageous design, the adjusting device includes a nut-and-spindle configuration which acts together on the one hand with the brake piston and on the other hand with the rolling-element ramp-type gear. Nut and spindle are connected by a thread in such a way that they can be twisted in relation to one another, with the spindle being connected in a twist-proof manner to the second ramp half arranged displaceably in the brake caliper housing.

According to another advantageous embodiment of the invention, the partially lined disk brake exhibits a hydraulic actuating device that is independent of the electromechanical actuating unit. In particular, this hydraulic actuating device is formed by a cylinder bore in the brake caliper in connection with the brake piston. Within such a configuration the hydraulic actuating device can be used for driving brake operations and the electromechanical actuating unit for parking brake operations. Thus, the two different modes of actuation can be designed and configured specifically for their respective function.

A particularly low-cost partially lined disk brake according to the present invention is achieved when the electromechanical actuating unit is formed by a direct current (DC) electric motor. Such electric motors are known in many different designs and can be used within the brake as a standardized component.

In a preferred embodiment of the partially lined disk brake, the electric motor has an angular-position sensor that is connected to the rotary movement of the electric motor, in particular can be integrated in the reduction gear or electric motor. Thus the current motor position and motor movement with direction of rotation and speed can be detected at any time and, consequently, provides information on the corresponding actuating state of the partially lined disk brake.

According to a further embodiment of the invention, the reduction gear is provided with a tool holding fixture to attach an emergency actuating element. In this way, an emergency actuation of the brake, i.e. releasing or clamping, is possible in the event of a malfunction, e.g. when there is no sufficient electric power supply.

An advantageous embodiment of the invention is achieved when at least the electromechanical actuating unit, planetary gear as well as a driving wheel of the spur gear form a first independent subassembly, which is arranged and fixed in the recess of the brake caliper that is configured as a housing. Furthermore, this first subassembly can be supplemented by additional meaningful single parts. Hence, this module can be preassembled simply outside the brake caliper and, after being inserted in the recess of the brake caliper, it can, for example, be fastened with screws. In the same way, it would be meaningful for at least the rolling-element ramp-type gear, engageable freewheel as well as an output wheel of the spur gear to form another independent subassembly. This second subassembly also can be preassembled and, finally, fastened in the recess of the brake caliper that is configured as a housing. These subassemblies give rise to a particularly easy-to-assemble modular design of the partially lined disk brake.

According to a preferable embodiment of the invention, the electromechanical actuating unit, actuating element as well as multi-step reduction gear are arranged and fastened within the brake caliper and sealed off against their surroundings by means of a housing cover. Thus, a particularly compact design is achieved for the brake caliper and, also, the individual assemblies of the partially lined disk brake can be accessed quickly and in an easy-to-assemble manner simply by removing the housing cover. The housing cover prevents contamination of the individual subassemblies and, hence, ensures safe operation of the brake.

DETAILED DESCRIPTION ON THE PREFERRED EMBODIMENTS

The combined brake caliper 1 of a partially lined disk brake shown in FIGS. 1–4 is suitable for realizing both driving brake and parking brake functions. It is designed as a floating caliper, i.e. it is mounted displaceably in relation to the clamping direction of the partially lined disk brake by means of guide bush 2 of a pin guide (not shown) on a brake holder attached to the vehicle. Brake caliper 1 overlaps with one bridge section 3 a brake disk that is not shown as well as brake linings arranged on both sides of the brake disk, which tribologically act on the brake disk in a known manner. In this respect, one of the brake linings is connected to brake piston 5 mounted displaceably in cylinder bore 4. The other brake lining is connected to a brake caliper side 6 lying axially outside the vehicle axis. The actual clamping force of the floating caliper-partially lined disk brake is transmitted in the known manner to the inner brake lining by means of brake piston 5 acting as actuating element. Due to the reaction force and the ensuing displacement of the brake caliper, the outer brake lining is also pressed against the brake disk.

Figure 1:
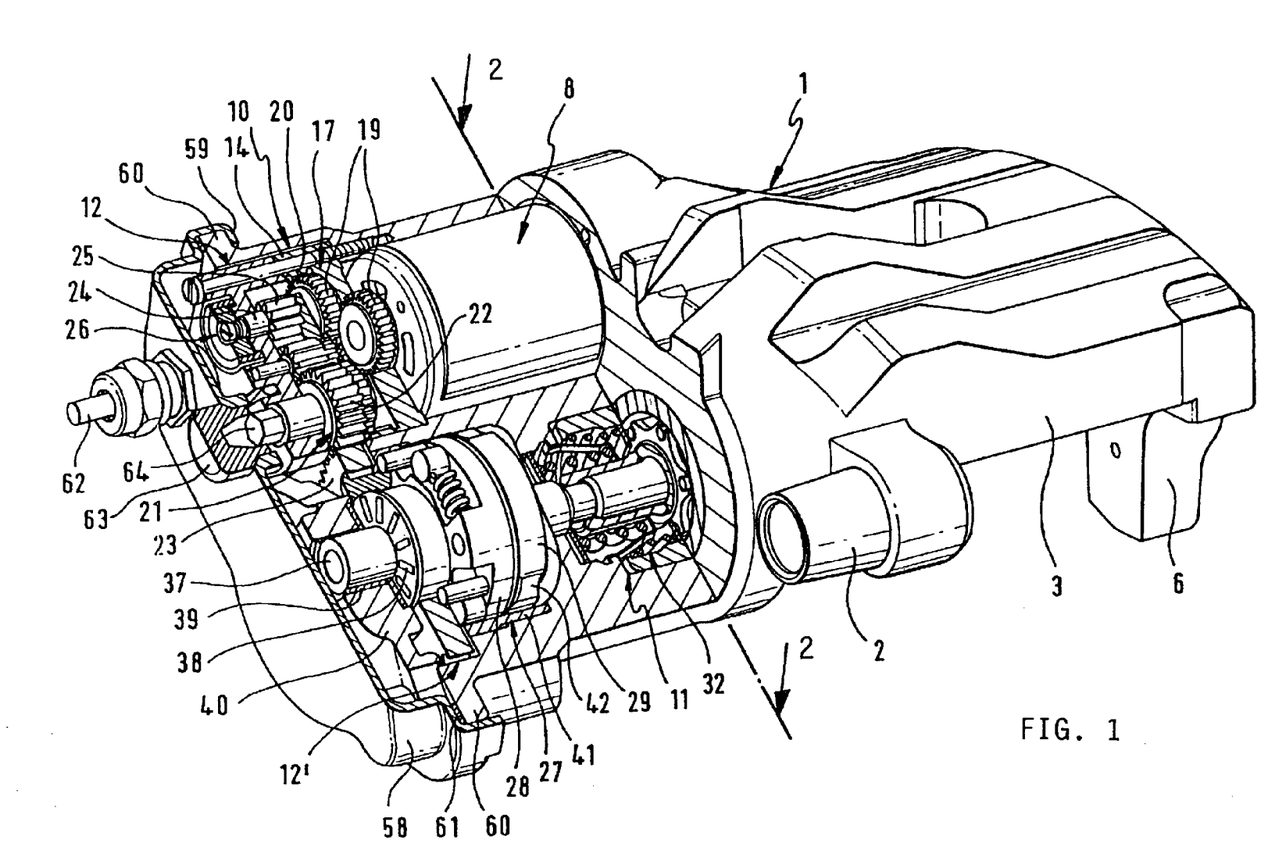
FIG. 1 is a partially sectioned view of an embodiment according to the invention, showing a combined brake caliper of a partially lined disk brake for driving brake and parking brake functions.
Figure 2:
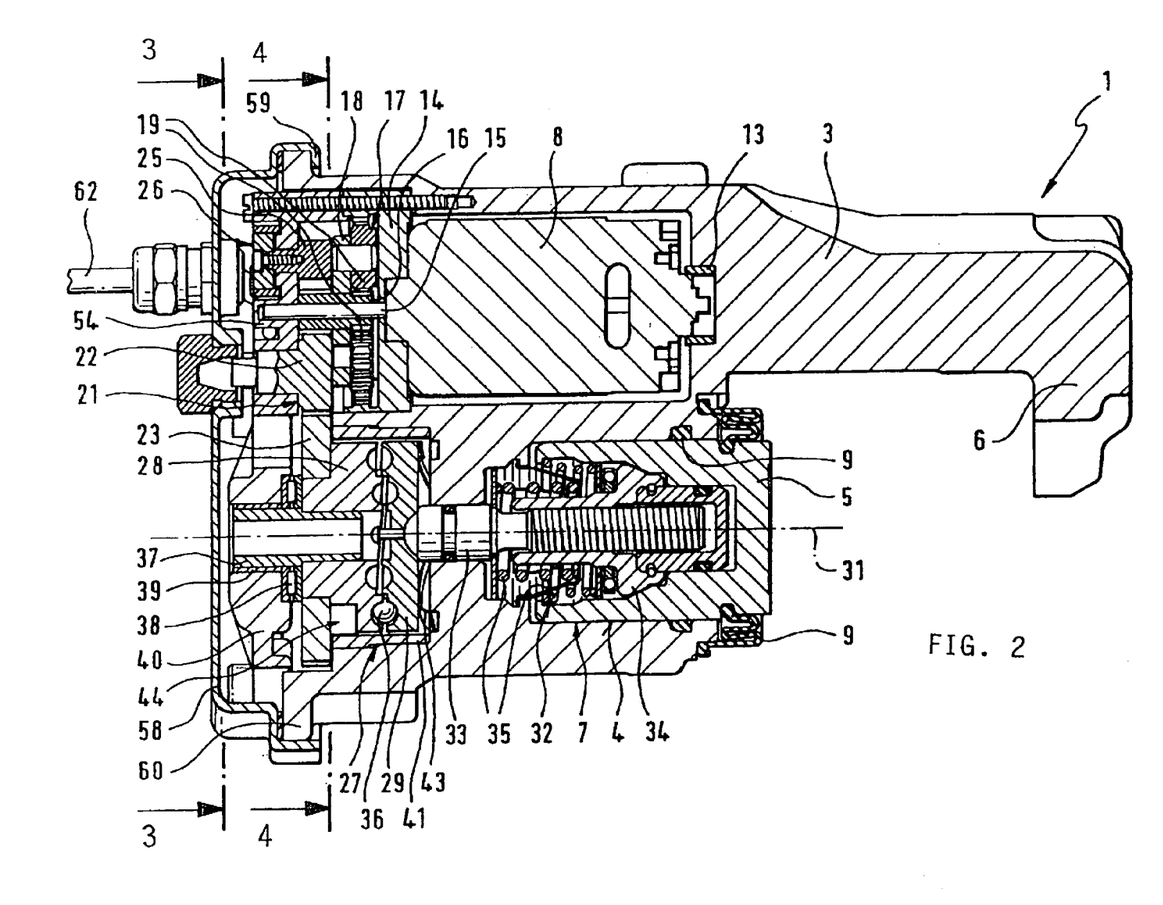
FIG. 2 is a view of the brake caliper taken substantially along the line 2—2 shown in FIG. 1.

In order to generate the required clamping force, a hydraulic actuating device 7 on the one hand and an electromechanical actuating unit 8 on the other hand are provided in brake caliper 1. The hydraulic actuating device 7 essentially comprises the cylinder bore 4 as well as the brake piston 5 and usually is provided for the driving brake function. For this purpose, the hydraulic pressure chamber formed by cylinder bore 4 and the inside of brake piston 5 is sealed off against the surroundings by means of sealing elements 9.

The electromechanical actuating unit 8 essentially is responsible for realizing the parking brake function and acts on the inner brake lining via an interposed multi-step reduction gear 10 as well as actuating element 11. For this purpose, the electromechanical actuating unit 8 is integrated in brake caliper 1 together with reduction gear 10 and actuating element 11 and located in recess 12, 12' of the brake caliper that is configured as a housing. The electromechanical actuating unit 8 preferably is designed as an electric motor. In this case, it should particularly be a DC motor and, hence, a standardized motor design can be used. Within brake caliper 1 the electric motor 8 is held on both sides via bearing bush 13 as well as bearing plate 14.

Actuating shaft 15 with sun wheel 16 attached to it is configured at the output end of electric motor 8. Sun wheel 16 is part of planetary gear 17 connected to actuating unit 8, which provides a high reduction of the motor speed while simultaneously increasing the torque.

Planetary gear 17 comprises planet carrier 18 with planet wheels 19, which become engaged in ring gear 20, wherein ring gear 20 is either formed firmly onto the brake caliper or, as shown in FIGS. 1–4, integrated in bearing plate 14, which is screwed together with brake caliper 1. At the output end planetary gear 17 is connected to spur gear 21, which comprises a driving wheel 22 and output wheel 23. At the same time, the speed at the output end of planetary gear 17 is transmitted to angular position sensor 26 via sensor shaft 24 with gearwheel 25. Thus, angular position sensor 26 is connected to electric motor 8 and, hence, allows the current determination of the angular position or rotary motion of electric motor 8 in relation to the direction of rotation and speed of rotation. Finally, this provides information on the current actuating state of the brake. Angular position sensor 26 can be realized in a particularly simple manner by means of a Hall sensor. For this purpose, it generally is necessary to have a connection to the rotary motion of electric motor 8, so that angular position sensor 26 can be located directly on electric motor 8 or a suitable position of reduction gear 10. In this connection, it is recommended that angular position sensor 26 be arranged as closely as possible to electric motor 8 due to the high speeds and, consequently, high resolution.

The spur gear step 21 following at the output end of planetary ear 17 causes another reduction in speed as well as increase in torque and serves to drive a rolling-element ramp-type gear 27 that is arranged coaxially to brake piston 5. Rolling-element ramp-type gear 27 in particular comprises several highly reducing ramp configurations which are formed onto two ramp halves 28, 29 in the shape of ramp guideways 30, wherein the two ramp halves 28, 29 can be twisted in relation to one another. Ramp guideways 30 are described in more detail in FIG. 6, using the second ramp half 29 as an example. Preferably they are two ramp guideways 30 that are concentrically arranged one inside another and additionally shifted by 180° in their angular position. Both ramp guideways have the same slope. Rolling-type bearing elements 36, in particular balls or rolls, which can roll in the ramp guideways 30 are arranged in ramp guideways 30. In order to increase the gear stroke at the output end, it is advantageous to provide ramp guideways 30 in such a way that they correspond to one another on both ramp halves 28, 29. The arrangement of ramp guideways 30 residing one inside another together with the angular displacement of ramp guideways 30 as compared to known ramp configurations allows an additional increase in the step-down ratio of rolling-element ramp-type gear 27. This also is achieved through the substantially increased twisting angle of the two ramp halves 28, 29 as compared to known ramp configurations, which is possible through the arrangement of ramp guideways 30. Hence, useable twisting angles up to about 270° can be realized.

The first ramp half 28 is connected in a twist-proof manner to output wheel 23 of spur gear 21 and arranged on bearing 38 in brake caliper 1 via a hollow shaft 37. For this purpose, hollow shaft 37 with bearing bush 39 is held rotatably in a traverse 40. Traverse 40 exhibits very high strength, i.e. it is preferably made of steel, and is firmly screwed to brake caliper 1. In contrast, the second ramp half 29 is resistant to twist; however, it can be displaced in recess 12' of brake caliper 1 in the direction of the brake piston axis 31. For this purpose, a bush 41 is fastened in a twist-proof manner in brake caliper 1, preferably by being pressed in firmly, and the second ramp half 29 in turn is arranged in a twist-proof manner on bush 41. For this purpose, the second ramp half 29 preferably has recesses 42 on its surface area which act together with appropriate beads of bush 41. A corresponding way of ensuring protection against torsion by means of recesses and appropriate beads also can be used between bush 41 and brake caliper 1. Preferably bush 41 has an outer knurling 48 at one end and is firmly pressed into brake caliper 1 with this end. However, the exact design of this protection against torsion is not decisive for the present invention. Configurations ensuring protection against torsion that work analogously, which fix the second ramp half 29 in a twist-proof manner in brake caliper 1 also are possible. The two ramp halves 28, 29 are pressed together by spring 43, and the rolling-type bearing elements 36 are always held in their correct position within the ramp guideways.

In detail, rolling-element ramp-type gear 27, by twisting the two ramp halves 28, 29 against one another, causes rolling-type bearing elements 36 to roll in ramp guideways 30. On the one hand this gives rise to a very high step-down in speed and on the other hand causes the rotary input variable (speed of the spur gear 21 at the output end) to be converted into a translational output variable (gear stroke) in the form of a "rotational-translational-gear". A gear stroke in the direction of the brake piston axis 31 is generated as the translational output variable. When brake caliper 1 is clamped electromechanically by means of actuating unit 8, this gear stroke is transmitted to brake piston 5 by way of a mechanical adjusting device 32, which acts as an actuating element. In this connection the gear stroke essentially corresponds to the clamping stroke of the brake piston.

Adjusting device 32 takes into account the wear of the brake linings and compensates for this by extending in the direction of the brake piston axis 5. Thus, the required clamping stroke of brake piston 5 and, consequently, the gear stroke of rolling-element ramp-type gear 27 can be held constant. Adjusting device 32 is connected in a twist-proof manner to rolling-element ramp-type gear 27 on the one hand and to brake piston 5 on the other hand. It can be extended in the direction of the brake piston axis 5 and essentially comprises a nut-and-spindle configuration with a spindle 33 attached in a twist-proof manner to the second ramp half 29 and a nut 34 arranged rotatably on spindle 33, which is supported on brake piston 5. Nut 34 and spindle 33 are tensioned against one another by means of several springs 35, so that the adjusting device 32 is extended in the direction of brake piston axis 31 when the brake linings show signs of wear. The basic design of such an adjusting device 32 as well as its function are known and shall not be explained in more detail here. With respect to further details of the adjusting device 32 as regards design and function, please refer to DE 195 21 634 A1. The characteristics of the adjusting device mentioned there can be used for the present invention.

Basically the entire, multi-step reduction gear 10 with planetary gear 17, spur gear 21 and rolling-element ramp-type gear 27 is designed to achieve high overall efficiency. Hence, reduction gear 10 exhibits an overall efficiency of η>50%, i.e. reduction gear 10 is a non-self-locking device.

In order to implement a parking brake function when the brake is clamped electromotively by means of actuating unit 8, it is therefore necessary to lock brake caliper 1 in the clamped state. This is realized by an engageable freewheel 44 that acts together with rolling-element ramp-type gear 27. The engageable freewheel 44 is arranged between output wheel 23 of spur gear 21 and the first ramp half 28. It works like a return lock. In the rotary clamping direction of actuating unit 8 as well as the reduction gear 17 or in the rotary clamping direction 50 of the first ramp half 28 the freewheel 44 always travels freely and does not obstruct transmission of the clamping forces to the two brake linings that are not shown. If, however, brake caliper 1 is in a clamped state, the reaction force resulting from the clamping force is taken up by rolling-element ramp-type gear 27 via brake piston 5 and adjusting device 32. Due to the high degree of efficiency, the first ramp half 28 tends to turn in the direction of the "release brake". However, this is prevented by the freewheel 44. For this purpose, clamping elements 46, preferably clamping rolls, to each of which the spring force of a pressure spring 45 is applied, roll along a sloped guide surface 47 and jam the first ramp half 28 with respect to brake caliper 1 or interposed bush 41. Thus, rolling-element ramp-type gear 27 is fixed in place and undesired unclamping of brake caliper 1 is prevented. For this purpose, output wheel 23 and the first ramp half 28 are connected to one another via pins 51 as regards their rotational movement, with there being clearance between output wheel 23 and first ramp half 28. Pins 51 are attached to the first ramp half 28 and protrude in the direction of output wheel 23, extending into associated recesses 52 of output wheel 23 by forming the above-mentioned clearance. Through this clearance freewheel 44 is locked by the reaction force of the brake clamping force, and the brake clamping force is maintained. This also applies when the electric motor 8 is switched off. Hence, the parking brake function can be realized.

Figure 4:
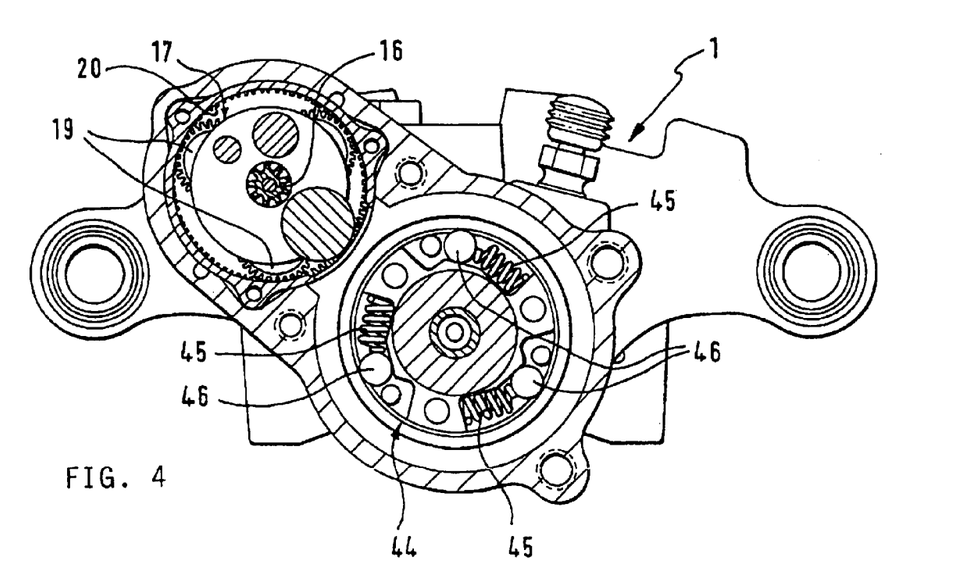
FIG. 4 is a view of the brake caliper along the line 4—4 in FIG. 2.
Figure 5A:
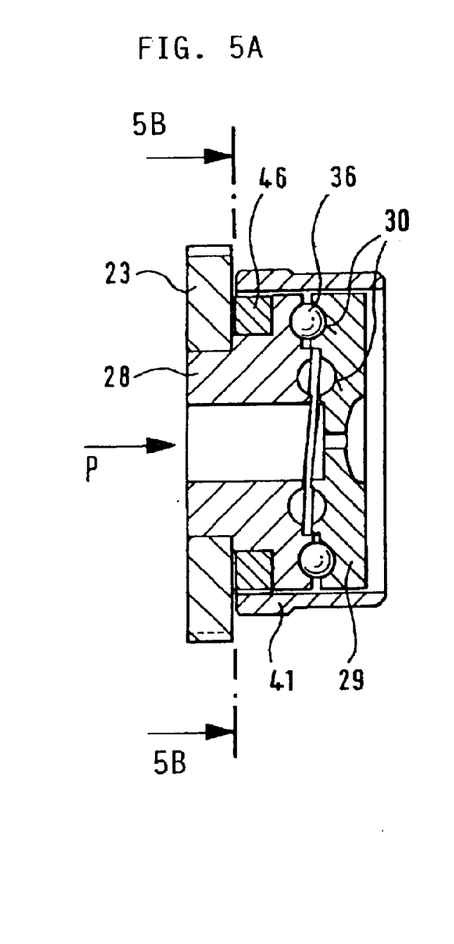
FIGS. 5A–5C provides several cross-sectional views of an embodiment of the rolling-element ramp-type gear with a freewheel.
Figure 5B:
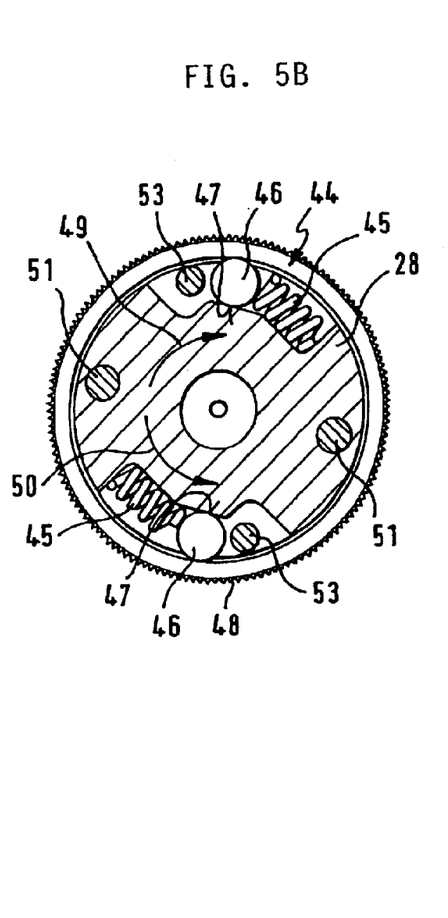
Figure 5C:
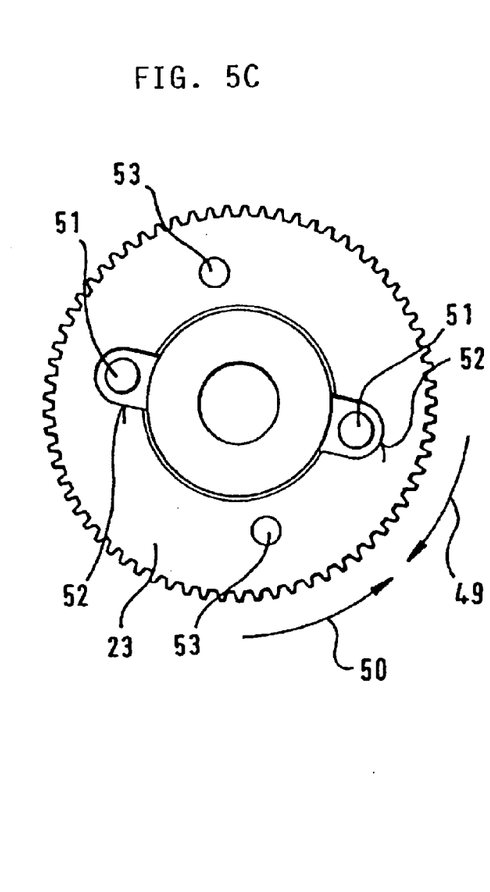
Figure 6A:
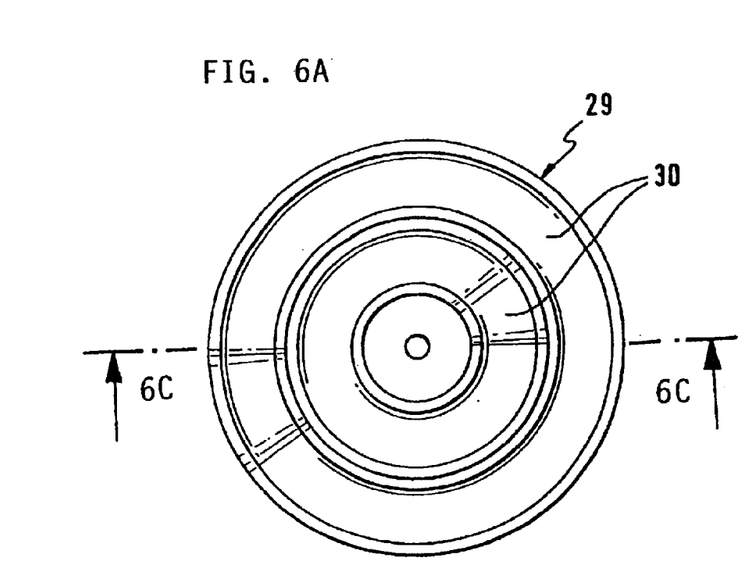
FIGS. 6A–6D provides several cut views of an embodiment of a ramp half of the rolling-element ramp-type gear.
Figure 6B:
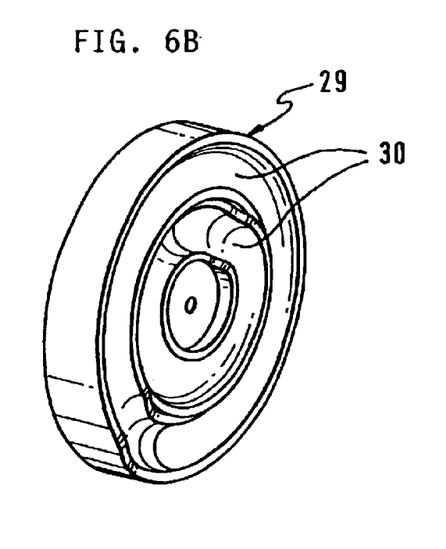
Figure 6C:
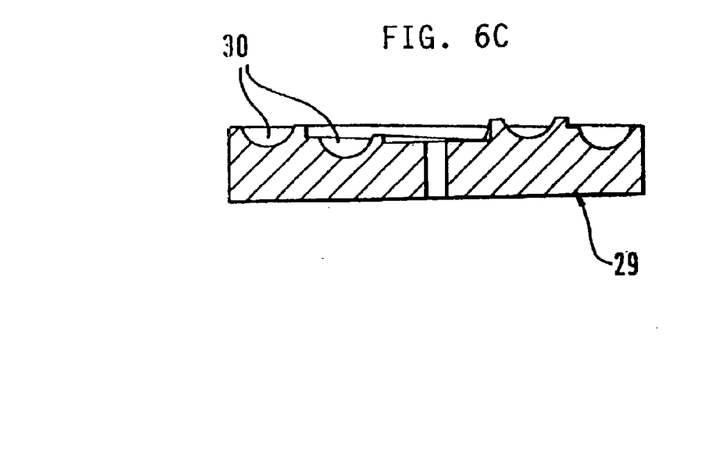
Figure 6D:
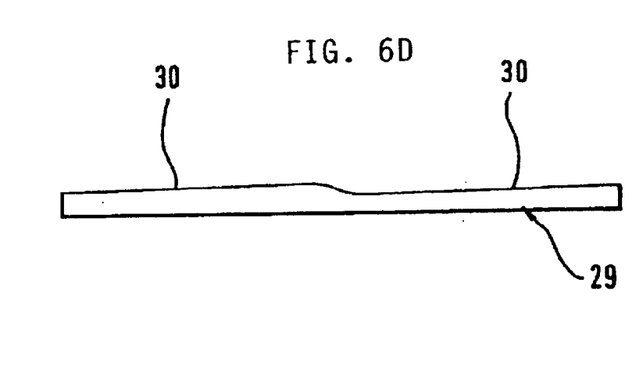

To loosen brake caliper 1 after electromotive actuation, the actuating unit 8 is operated in the direction of rotation of release. Thus, reduction gear 10 also causes the first ramp half 28 to turn in the direction of rotation of release. Output wheel 23 and the actuating pins 53 connected in a twist-proof manner thereon rotate slightly with respect to the first ramp half 28 jammed with brake caliper 1, without transmitting any torque at first due to the clearance. This relative twist of output wheel 23 and ramp half 28 causes the clamping elements to be loosened because actuating pins 53 extending into the first ramp half 28 push clamping elements 46 from their lock position and release the freewheel 44. The position of actuating pins 53, pins 51, recesses 52 as well as clamping elements 46 in their lock position is coordinated in such a way that—in order to release the locked freewheel 44—actuating pins 53 come into contact with clamping elements 46 first and release the lock function before pins 51 become engaged with the associated recesses 52 in order to transmit torque. Thus, the switching function of freewheel 44 allows the rolling-element ramp-type gear 27 to be unlocked by operating the actuating unit 8 in the release direction of rotation and, hence, release of the brake. As shown in FIGS. 4 and 5, the number of actuating pins 53, pins 51, clamping elements 46 as well as pressure springs 45 is not limited to a certain number according to the invention. The figures merely show advantageous embodiments.

Figure 3:
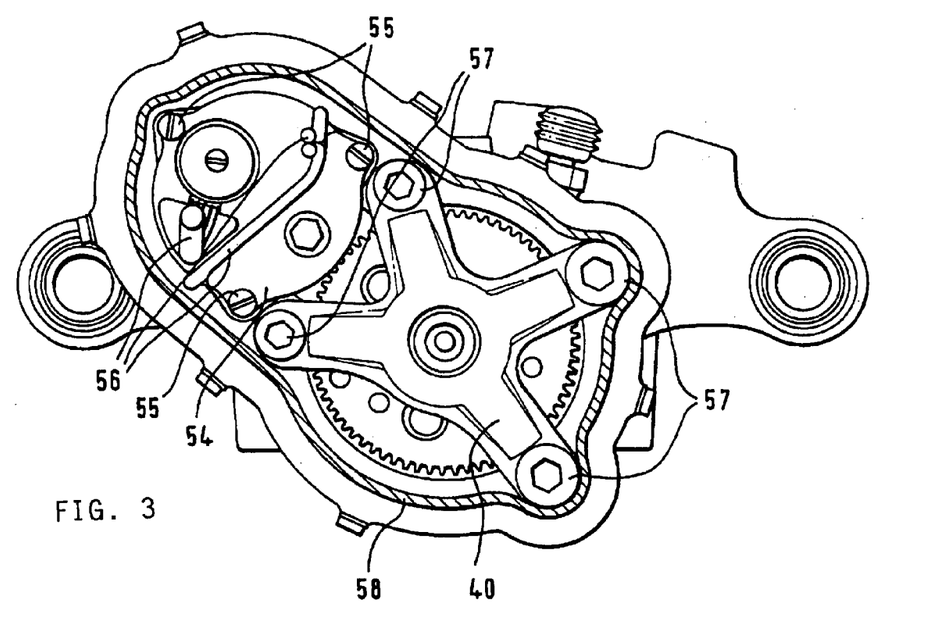
FIG. 3 is a view of the brake caliper along the line 3—3 in FIG. 2.

Arranging the electromechanical actuating unit 8 parallel to the brake piston axis 31 allows a particularly compact design for brake caliper 1 on the one hand and the possibility of a modular design on the other hand. Such a first subassembly essentially comprises actuating unit 8, planetary gear 17, bearing plate 14 with hollow wheel 20, angular position sensor 26, drive wheel 22 as well as a ear cover 54. Due to the gear cover 54 this first subassembly can be preassembled outside brake caliper 1 and finally mounted in brake caliper 1 with fastening screws 55. Gear cover 54 also serves for holding sensor shaft 24 and drive wheel 22 of spur gear 21. In addition, the electric lines 56 for actuating unit 8 and angular position sensor 26, as shown in FIG. 3, run through gear cover 54 or are guided through it.

Furthermore, a second subassembly comprising rolling-element ramp-type gear 27, engageable freewheel 44, output wheel 23, hollow shaft 37 with bearing bush 39 as well as bearing 38 and traverse 40 can be formed. For this purpose, hollow shaft 37 is connected by bearings to traverse 40 via bearing bush 39 and bearing 38. Bearing 38 can be designed as a thrust bearing or angular ball bearing or shoulder bearing in order to improve the radially effective bearing properties. This second subassembly also can be preassembled as an independent module outside brake caliper 1. After the second subassembly is mounted in recess 12' of the brake caliper, screws are used to attach the subassembly to brake caliper 1 via traverse 40. For this purpose, traverse 40 and screws 57 have to be stable, since they are used for taking up the reaction force of the brake clamping force.

Finally, brake caliper 1 is closed by means of a housing cover 58, which seals off brake caliper 1 against its surroundings. For this purpose, housing cover 58 exhibits several bent straps 59 distributed along its circumference, and these are used for fastening it to an associated collar 60 on brake caliper 1. To improve the tightness of the seals, an additional seal 61 can be provided between housing cover 58 and brake caliper 1. The electric supply line 62 for actuating unit 8 and angular position sensor 26 also is led through housing cover 58.

In order to implement a mechanical emergency actuation of the brake, e.g. when there is a power failure, a hole locked with a removable stop 63 is provided in housing cover 58. This hole provides access to a tool holding fixture 64 at the drive wheel 22 of spur gear 21. When a suitable tool is inserted in the tool holding fixture 64, the reduction gear 10 can be rotated to loosen or clamp the brake. Naturally the tool holding fixture also can be arranged at any suitable position of reduction gear 10 or actuating unit 8.

Although the embodiment of a brake caliper according to the present invention shown in the illustrations has both a hydraulic actuating device 7 and an electromechanical actuating unit 8, this is not absolutely necessary. If the actuating unit 8 and reduction gear 10 are dimensioned sufficiently, i.e. when sufficiently high clamping forces can be generated, the additional hydraulic actuating device 7 will not be needed. Due to the engageable freewheel 44, both the driving and parking brake functions can be realized solely by means of the electromechanical actuating unit.

What is claimed is:
1. An electromechanically actuated partially lined disk brake assembly, comprising:
   a brake caliper,
   an electromechanical actuating unit, at least two brake linings that are displaceably arranged in the brake caliper and act on a friction surface of a brake disk a multi-step reduction gear that is arranged between the actuating unit and an actuating element, wherein said actuating unit, multi-step reduction gear, and actuating element are located in a recess of the brake caliper that is configured as a housing, wherein the multi-step reduction gear which is configured as a non-self-locking device, and includes an engageable freewheel and a rolling-element ramp gear, and wherein the rolling-element ramp gear exhibits a plurality of ramp configurations, one residing inside another.

2. A partially lined disk brake according to claim 1, wherein the rolling-element ramp gear exhibits two ramp halves that can be twisted relative to one another, wherein a first ramp half of said two ramp halves is connected to the electromechanical actuating unit at the output end and a second ramp half being operatively connected to the actuating element.

3. A partially lined disk brake according to claim 2, wherein the second ramp half is arranged in a twist-proof manner in the brake caliper.

4. A partially lined disk brake according to claim 1, wherein the engageable freewheel is designed as a return stop effective in the direction opposite to the direction of rotation of clamping.

5. A partially lined disk brake according to claim 1, wherein the reduction gear includes a planetary car connected to the electromechanical actuating unit at the driving end.

6. A partially lined disk brake according to claim 5, wherein the reduction gear includes a spur gear connected to the planetary gear at the driving end and to the rolling-element ramp-type gear at the output end.

7. A partially lined disk brake according to claim 1, wherein the actuating element includes a brake piston arranged displaceably in the brake caliper and connected operatively to at least one brake lining, wherein said brake piston is connected to the rolling-element ramp gear at the output end.

8. A partially lined disk brake according to claim 1, wherein the actuating element exhibits an adjusting device extendable in the clamping direction of the partially lined disk brake, which is arranged displaceably in the brake caliper, with said adjusting device being operatively connected to at least one brake lining on the one hand and connected to the rolling-element ramp gear at the output end on the other hand.

9. A partially lined disk brake according to claim 8, wherein the adjusting device includes a nut-and-spindle configuration that can be twisted relative to one another and acts on the brake piston on one side.

10. A partially lined disk brake according to claim 9, wherein the nut-and-spindle configuration is connected to the second ramp half in a twist-proof manner.

11. A partially lined disk brake according to claim 7, wherein the partially lined disk brake further includes a hydraulic actuating device that is independent of the electromechanical actuating unit.

12. A partially lined disk brake according to claim 1, wherein the electromechanical actuating unit includes a DC electric motor.

13. A partially lined disk brake according to claim 12, wherein the electric motor includes an angular position sensor.

14. A partially lined disk brake according to claim 13, wherein the angular position sensor is designed as a Hall sensor.

15. A partially lined disk brake according to claim 1, wherein the multi-slip reduction gear includes a tool holding fixture for an emergency actuating element.

16. A partially lined disk brake according to claim 1, wherein the electromechanical actuating unit and the reduction gear are sealed off against their surroundings by means of a housing cover attached to the brake caliper.

17. A partially lined disk brake according to claim 6, wherein the electromechanical actuating unit, planetary gear form a first independent subassembly that is located in a first recess of the brake caliper that is configured as a housing.

18. A partially lined disk brake according to claim 17, wherein the rolling-element ramp device, and the engageable freewheel form a second independent subassembly that is located in a first recess of the brake caliper that is configured as a housing.

\* \* \* \* \*

UNITED STATES PATENT AND TRADEMARK OFFICE
CERTIFICATE OF CORRECTION

PATENT NO. : 6,761,252 B1 Page 1 of 1
DATED : July 13, 2004
INVENTOR(S) : Weiler et al.

It is certified that error appears in the above-identified patent and that said Letters Patent is hereby corrected as shown below:

<u>Column 9,</u>
Line 29, please change "planetary car" to -- planetary gear --.

Signed and Sealed this

Twenty-eighth Day of December, 2004

JON W. DUDAS
*Director of the United States Patent and Trademark Office*